United States Patent
Kawaguchi

(10) Patent No.: US 8,997,314 B2
(45) Date of Patent: Apr. 7, 2015

(54) FASTENING TOOL FOR STRING BODY

(75) Inventor: Gaku Kawaguchi, Yokohama (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 505 days.

(21) Appl. No.: 13/384,129

(22) PCT Filed: Jul. 8, 2010

(86) PCT No.: PCT/JP2010/061644
§ 371 (c)(1),
(2), (4) Date: Feb. 23, 2012

(87) PCT Pub. No.: WO2011/007715
PCT Pub. Date: Jan. 20, 2011

(65) Prior Publication Data
US 2012/0159752 A1    Jun. 28, 2012

(30) Foreign Application Priority Data

Jul. 14, 2009    (JP) .................................. 2009-165868

(51) Int. Cl.
*A43C 7/00* (2006.01)
*F16G 11/10* (2006.01)
*A43C 11/00* (2006.01)

(52) U.S. Cl.
CPC .............. *A43C 11/00* (2013.01); *F16G 11/101* (2013.01)

(58) Field of Classification Search
CPC ....... F16G 11/101; F16G 11/10; A43C 11/00; A43C 7/00; A43C 11/02; A43C 11/10
USPC ............................................ 24/115 G, 712.5
See application file for complete search history.

(56) References Cited

U.S. PATENT DOCUMENTS

| 6,672,237 B2 * | 1/2004 | Hillier ........................ 24/115 G |
| 7,254,871 B2 * | 8/2007 | Yoshiguchi ................ 24/115 G |
| 7,722,219 B2 * | 5/2010 | Hartley ...................... 24/115 G |
| 2005/0268436 A1 * | 12/2005 | Yoshiguchi ................ 24/115 G |

(Continued)

FOREIGN PATENT DOCUMENTS

| EP | 1 018 609 A1 | 8/2004 |
| JP | H08-089316 | 4/1996 |

(Continued)

OTHER PUBLICATIONS

Taiwanese Patent Office, "Office Action for TW 099122937Jul. 31, 2012", a Japanese translation of the Taiwanese Office Action.

(Continued)

*Primary Examiner* — Robert J Sandy
(74) *Attorney, Agent, or Firm* — Manabu Kanesaka

(57) ABSTRACT

In a fastening tool, a male member is combined to a female member such that the male member can be pushed to at least a predetermined position of the female position against urging force. The fastening tool is fastened to the string body that is inserted through a side through-hole of the male member and a side through-hole of the female member that communicate with each other at the predetermined position by releasing the push-in state of the male member. The male member includes an attaching portion of an operating elongated member, and the operating elongated member is operated to move the male member to the predetermined position against the urging force. A positioning device to a fitting object is formed on the female member.

3 Claims, 12 Drawing Sheets

(56) References Cited

U.S. PATENT DOCUMENTS

| | | | |
|---|---|---|---|
| 2006/0085952 A1 | 4/2006 | Kaneko | |
| 2006/0213037 A1* | 9/2006 | Yoshiguchi | 24/115 G |
| 2010/0257701 A1* | 10/2010 | Gammell et al. | 24/115 G |

FOREIGN PATENT DOCUMENTS

| | | |
|---|---|---|
| JP | 2005-000213 | 1/2005 |
| JP | 2006-122233 | 5/2006 |
| JP | 2009-011597 | 1/2009 |
| TW | 385640 | 3/2000 |
| TW | 530547 | 5/2003 |
| TW | 589161 | 6/2004 |
| TW | M285936 | 1/2006 |
| WO | WO 2009/012081 A1 | 1/2009 |

OTHER PUBLICATIONS

Japanese Patent Office, "Office Action for JP2009-165868", Oct. 30, 2012.

* cited by examiner

FASTENING TOOL FOR STRING BODY

TECHNICAL FIELD

The present invention relates to an improvement of a fastening tool used such that the fastening tool is fastened to a desired position of a string body while the string body passes through the fastening tool.

BACKGROUND ART

There is a fastening tool for a string body that is generally called a cord lock. The fastening tool includes a female member and a male member having through-holes through which the string body is inserted, and an urging device urging the male member in a direction in which the male member is removed from the female member. When a push-in operation for the male member is stopped by the urging force from an urging device, the male member is moved from a non-fastening position through which the string body is inserted without frictions in the through-hole of the female member and the through-hole of the male member or with small frictions therein, and the fastening tool is fastened to the string body with the through-hole of the female member and the through-hole of the male member that are displaced from each other. However, when the fastening tool, for example, is fastened to a drawstring of an opening of a glove serving as a fitting object, a push-in operation for the male member may not be easily performed by the other hand with a glove. For this reason, a fastening tool that is designed such that a release string fixed to a glove is attached to a deep portion of a male member is proposed. (see Patent Document 1) According to the fastening tool, the male member can be moved to the non-fastening position by a drawing operation for the release string. In this manner, the fastening position of the fastening tool on the drawstring can also be changed to loosen the tightened drawstring. However, since the female member has a margin for the glove, when the release string is only simply drawn, releasing the fastening state of the fastening tool to the drawstring may be difficult.

PRIOR ART

Patent Document

Patent Document 1: Japanese Examined Utility-Model Publication No. 5-2090

SUMMARY OF THE INVENTION

Problem to be Solved by the Invention

The main problem to be solved by the invention is that, in a fastening tool of the type, a fastening state to a string body is more easily released.

Means for Solving the Problems

In order to solve the problem, according to the invention, there is provided a fastening tool for a string body in which a male member is combined to a female member such that the male member can be pushed to at least a predetermined position of the female position against urging force, and the fastening tool is fastened to the string body that is inserted through a side through-hole of the male member and a side through-hole of the female member that communicate with each other at the predetermined position by releasing the push-in state of the male member. The male member includes an attaching portion of an operating elongated member, the operating elongated member being operated to move the male member to the predetermined position against the urging force, and a positioning device to a fitting object is formed on the female member.

In the fastening tool, the male member can be positioned to an arrangement position of the fastening tool on the fitting object by the positioning device of the female member. In this manner, first, the male member itself is pushed to the predetermined position or the string body is drawn by force having strength that can push the male member to the predetermined position to make it possible to perform an operation of releasing the fastening state of the fastening tool to the string body without pressing the female member. Secondly, an operation of drawing the male member to the predetermined position by drawing the operating elongated member can be easily performed without pressing the female member.

When the positioning device is used as a passing portion for an elongated member formed on a side portion of the female member and arranged on a fitting object, by using the elongated member arranged on the fitting object in a direction crossing the push-in direction of the male member, the female member can be stably positioned to the fitting object to prevent the female member from moving and escaping with the push-in operation. When the passing portions are formed at two positions of the side portion of the female member, the elongated member drawn through one of the two passing portions is caused to pass through the other of the two passing portions so as to make it possible to more stably position the female member to the fitting object and to make it possible to move and adjust the female member in the longitudinal direction of the elongated member.

Effect of the Invention

According to the invention, a fastening state of a fastening tool of the type to a string body can be more easily released.

MODE FOR CARRYING OUT THE INVENTION

Figure 1:
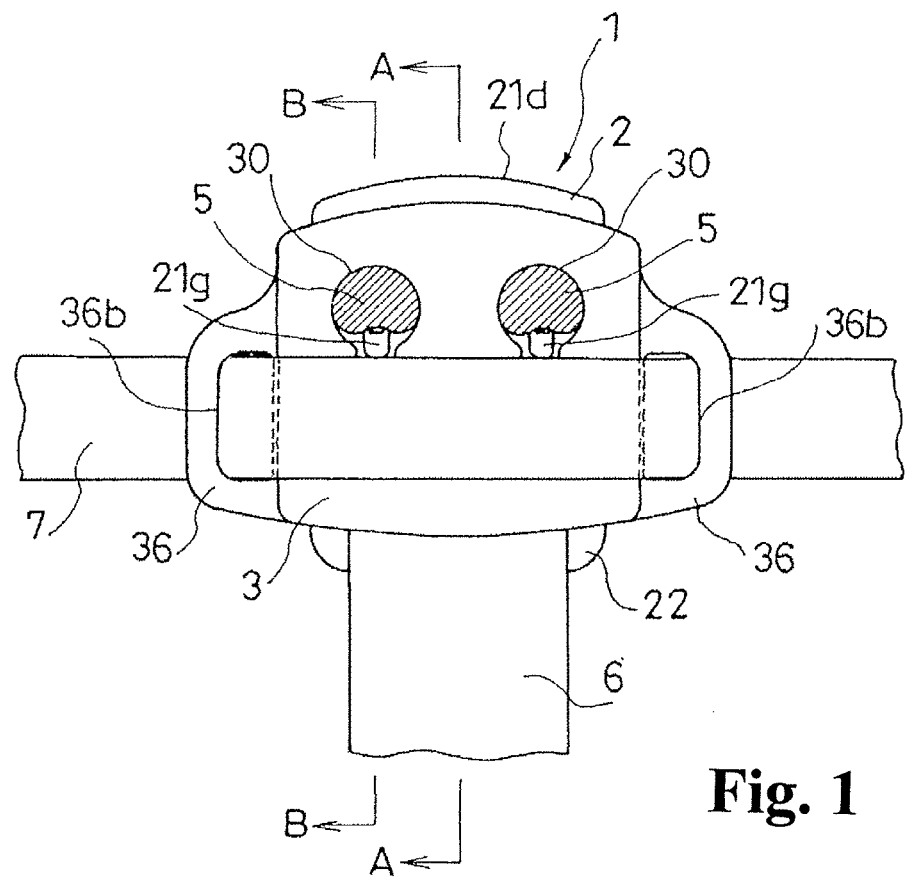
FIG. 1 is a front view showing an application state of a fastening tool.
Figure 2:
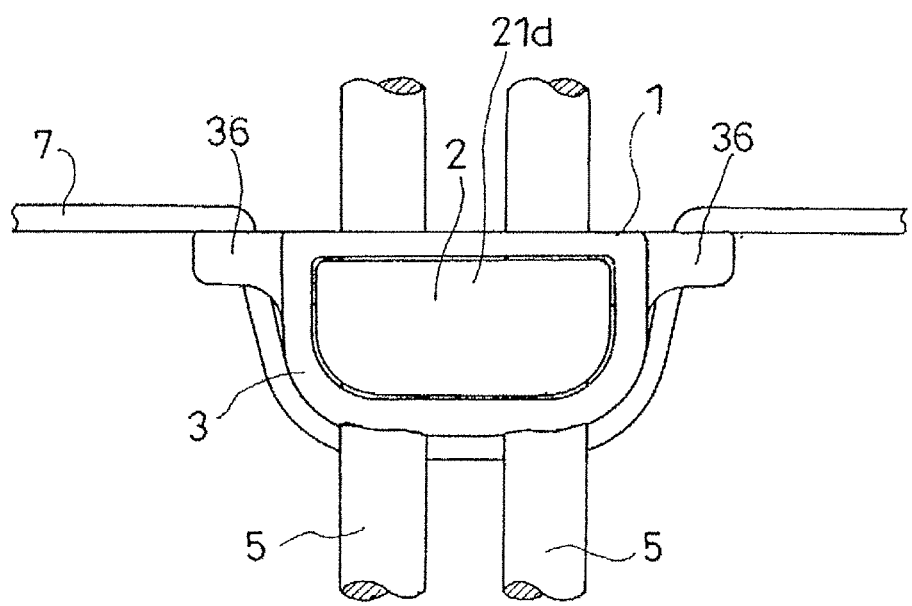
FIG. 2 is a plan view showing the application state of the fastening tool.
Figure 3:
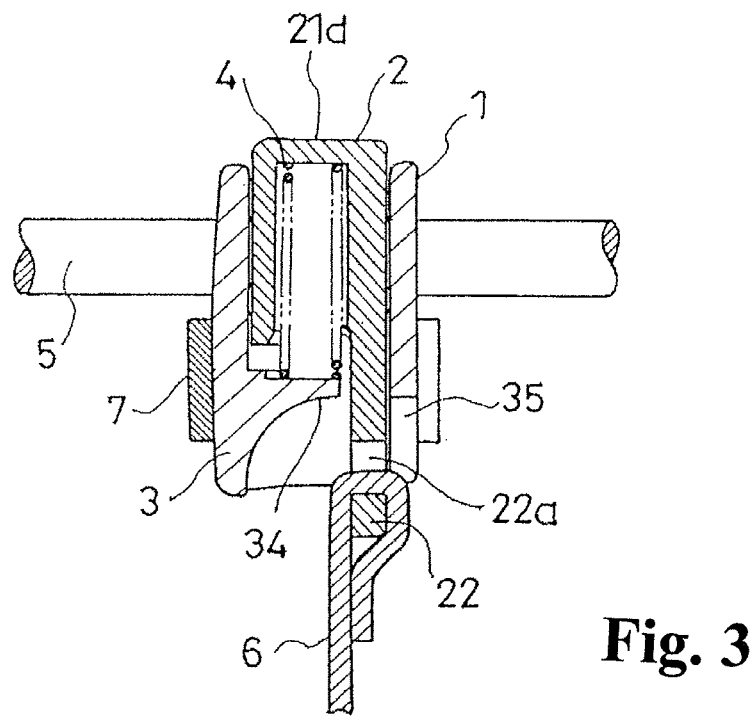
FIG. 3 is a cross-sectional view along the line A-A in FIG. 1.
Figure 4:
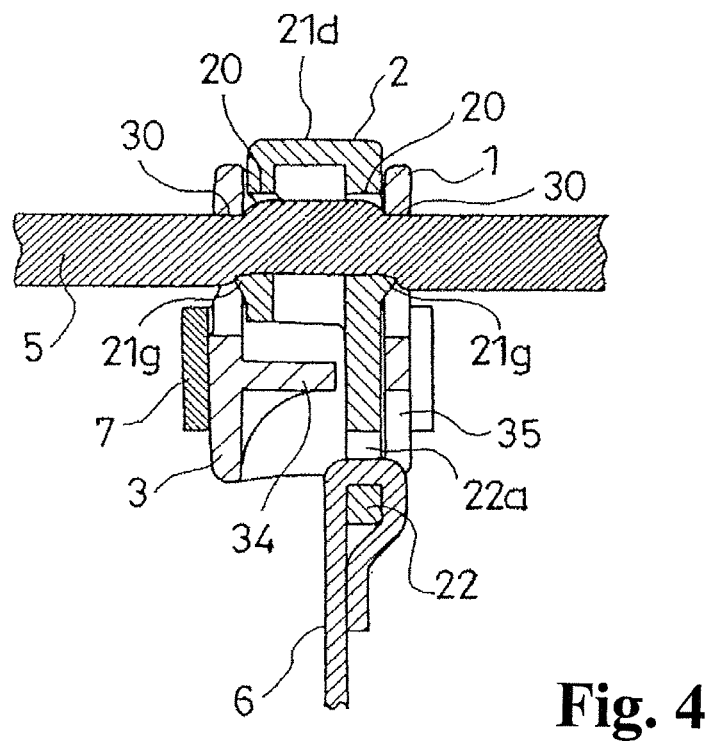
FIG. 4 is a cross-sectional view along the line B-B in FIG. 1.
Figure 5:
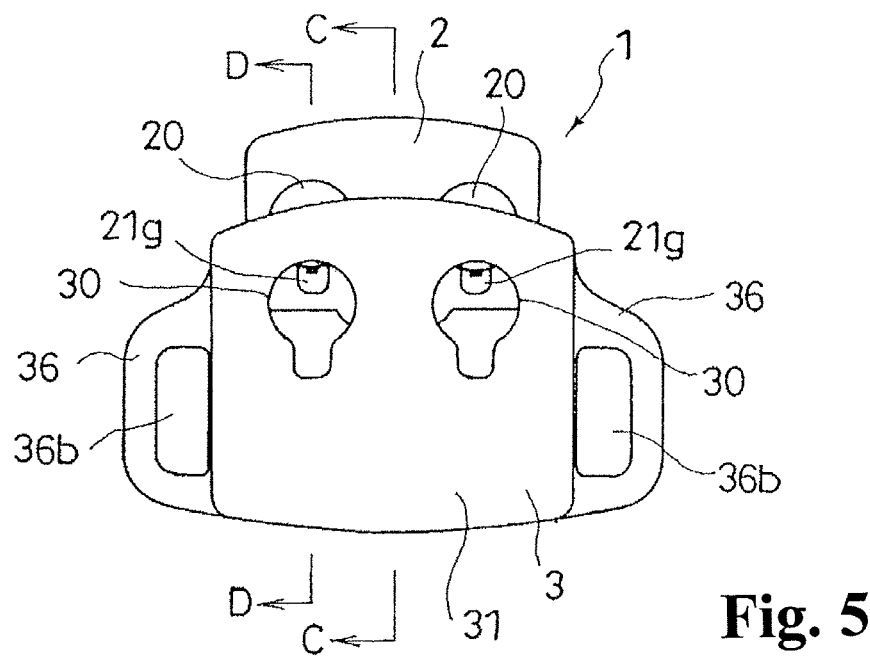
FIG. 5 is a front view of the fastening tool.
Figure 6:
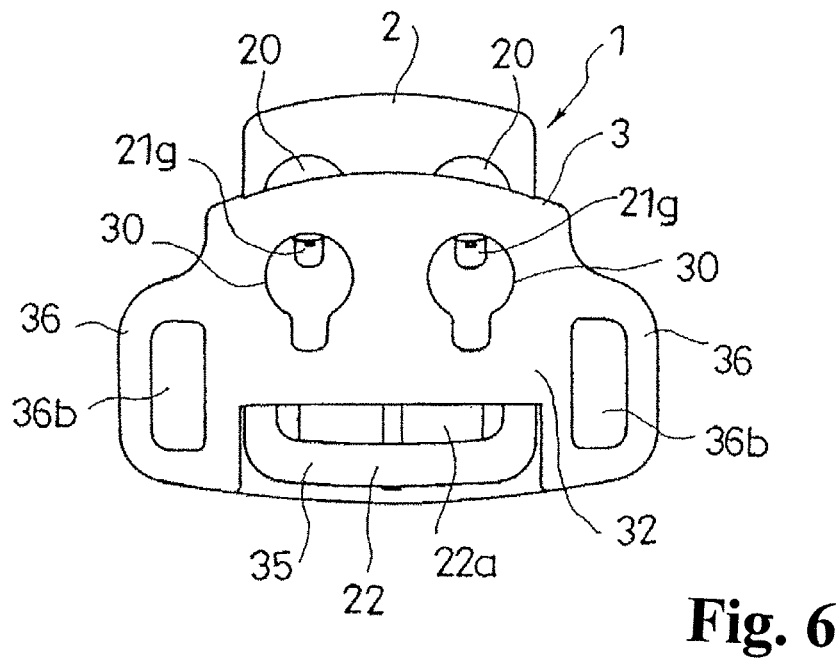
FIG. 6 is a back view of the fastening tool.
Figure 7:
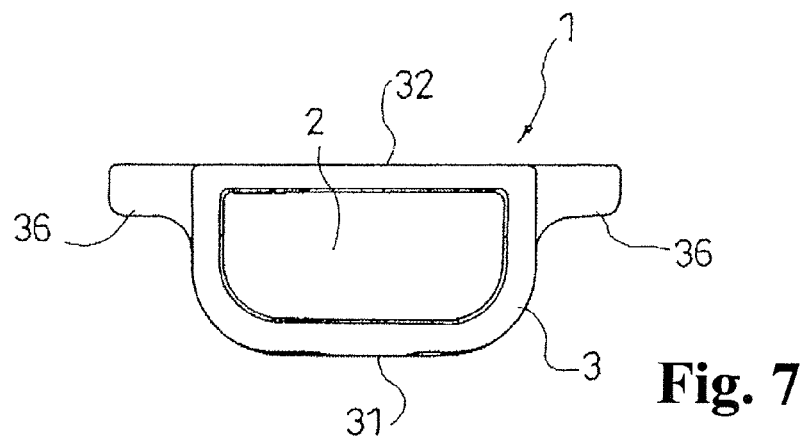
FIG. 7 is a plan view of the fastening tool.
Figure 8:
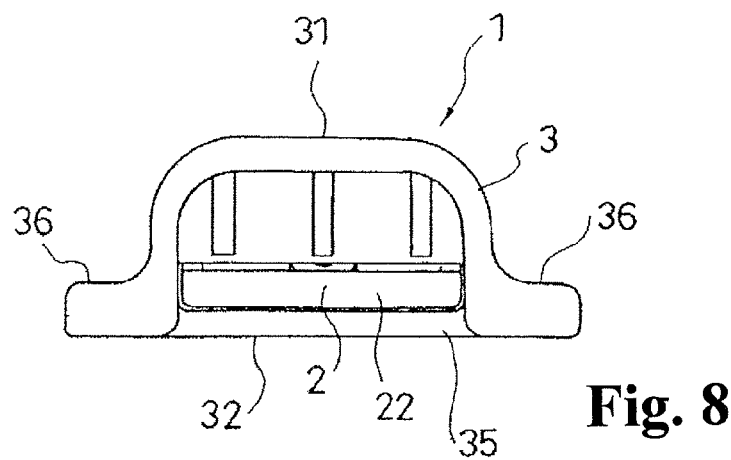
FIG. 8 is a bottom view of the fastening tool.
Figure 9:
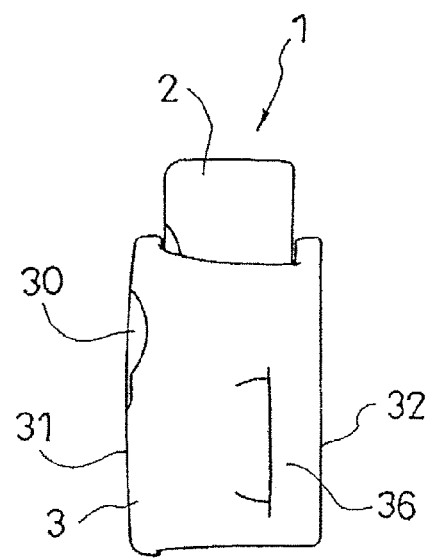
FIG. 9 is a right-side view of the fastening tool.
Figure 10:
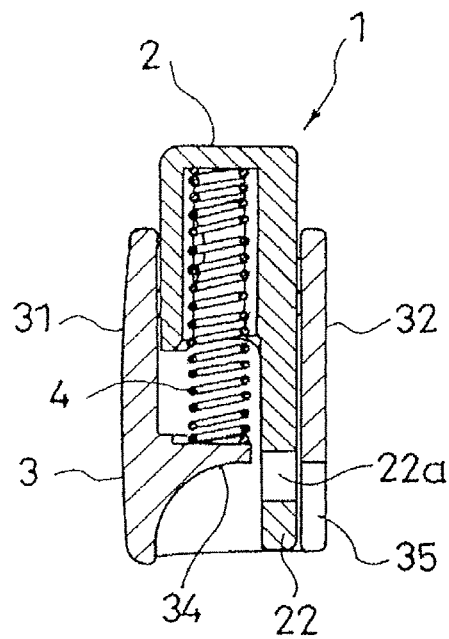
FIG. 10 is a cross-sectional view along the line C-C in FIG. 5.
Figure 11:
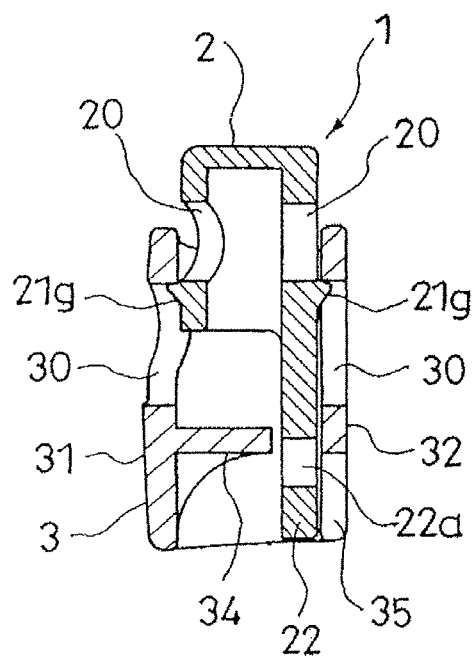
FIG. 11 is a cross-sectional view along the line D-D in FIG. 5.
Figure 12:
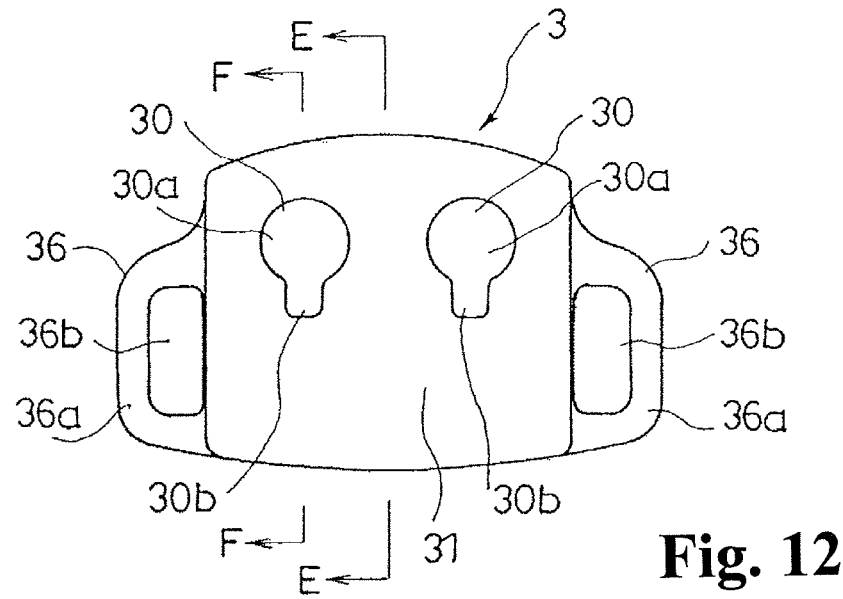
FIG. 12 is a front view of a female member.
Figure 13:
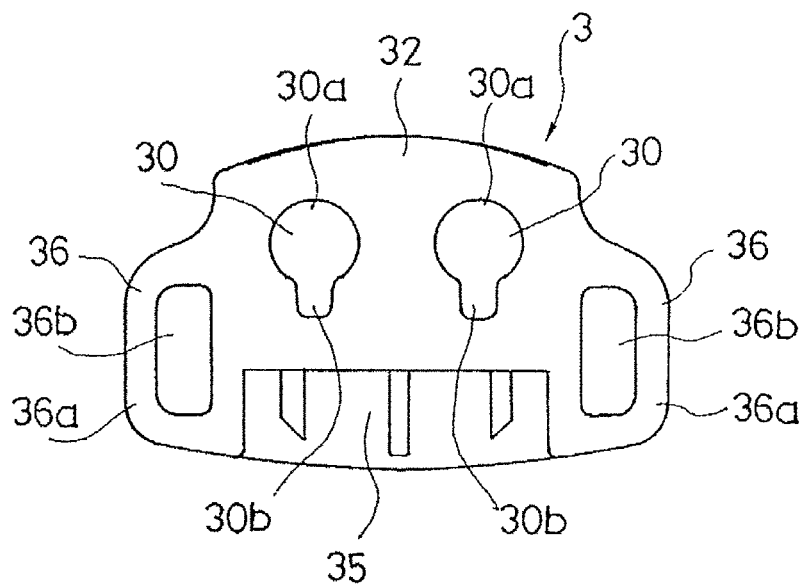
FIG. 13 is a back view of the female member.
Figure 14:
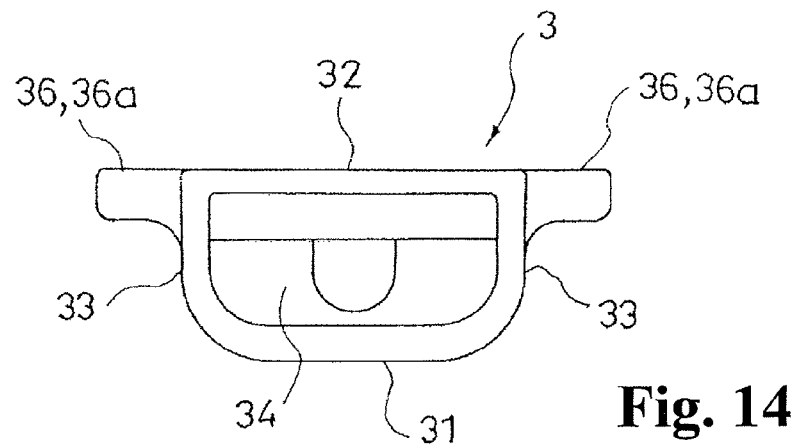
FIG. 14 is a plan view of the female member.
Figure 15:
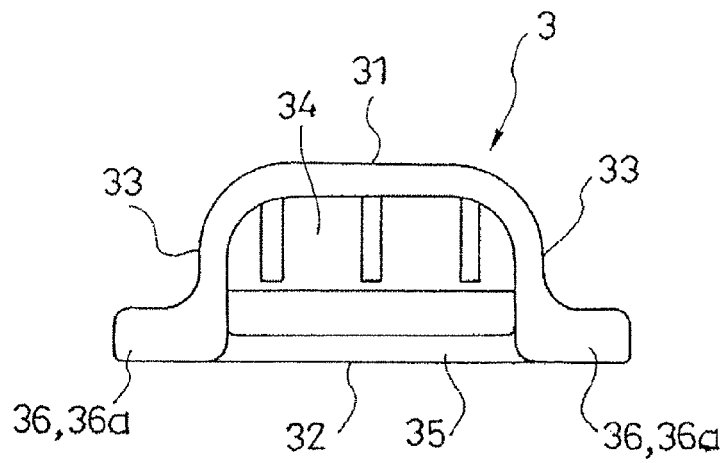
FIG. 15 is a bottom view of the female member.
Figure 16:
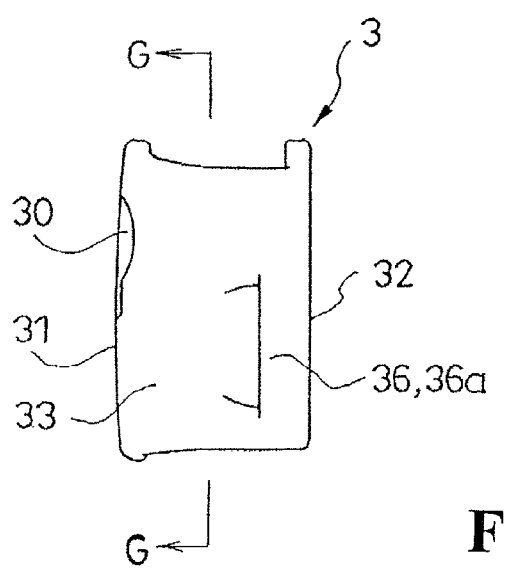
FIG. 16 is a right-side view of the female member.
Figure 17:
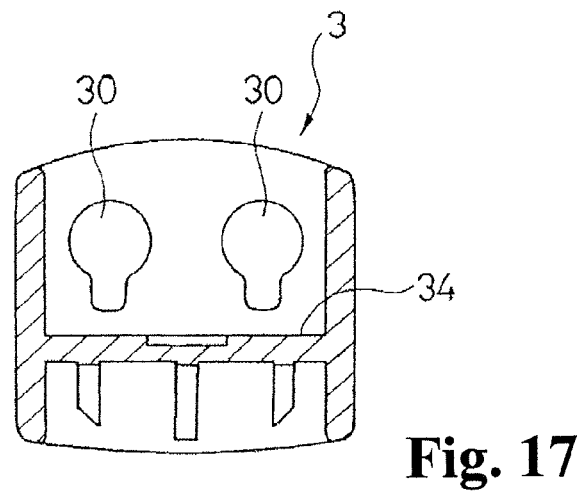
FIG. 17 is a cross-sectional view along the line G-G in FIG. 16.
Figure 18:
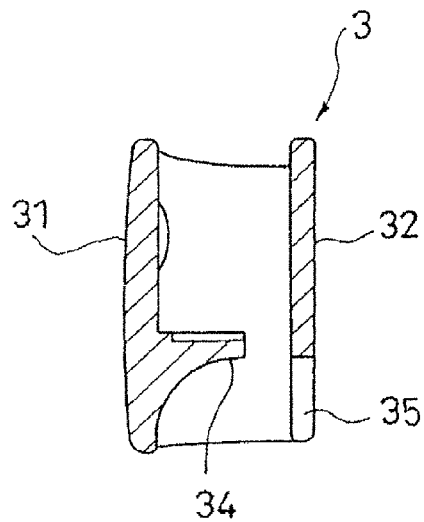
FIG. 18 is a cross-sectional view along the line E-E in FIG. 12.
Figure 19:
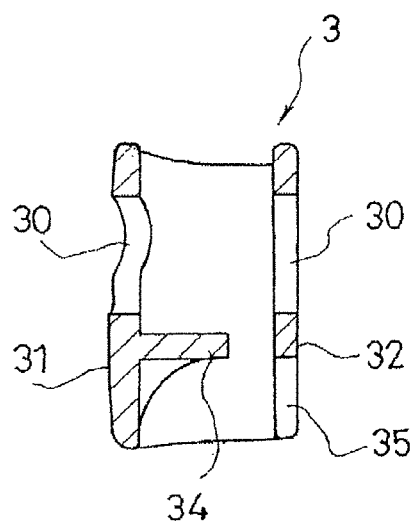
FIG. 19 is a cross-sectional view along the line F-F in FIG. 12.
Figure 20:
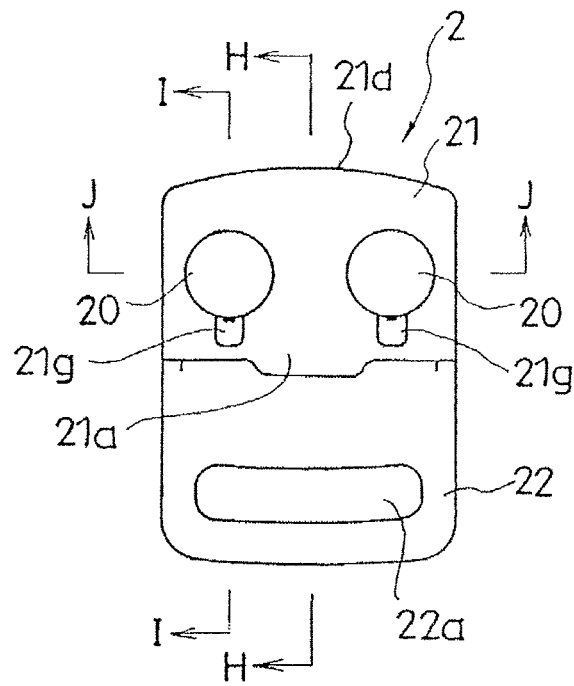
FIG. 20 is a front view of a male member.
Figure 21:
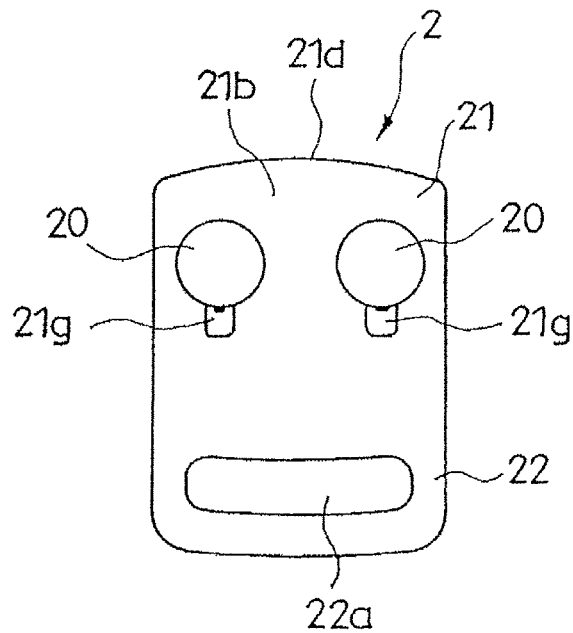
FIG. 21 is a back view of the male member.
Figure 22:
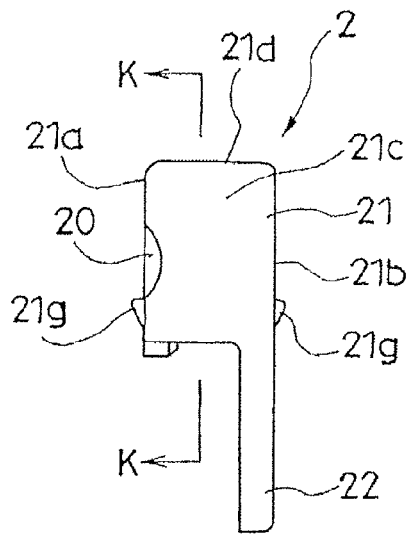
FIG. 22 is a right-side view of the male member.
Figure 23:
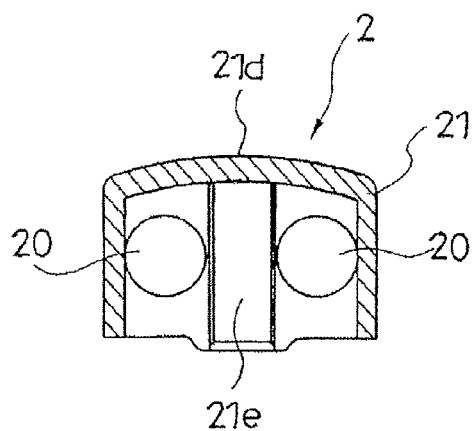
FIG. 23 is a cross-sectional view along the line K-K in FIG. 22.
Figure 24:
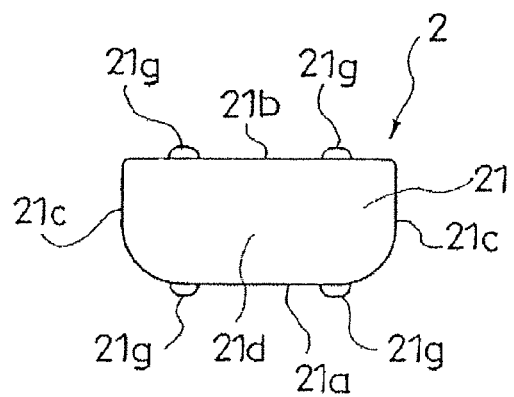
FIG. 24 is a plan view of the male member.
Figure 25:
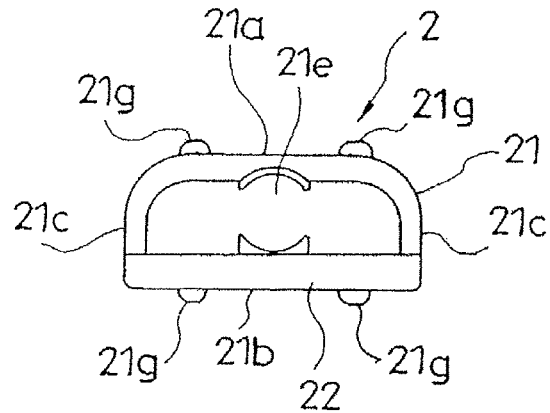
FIG. 25 is a bottom view of the male member.
Figure 26:
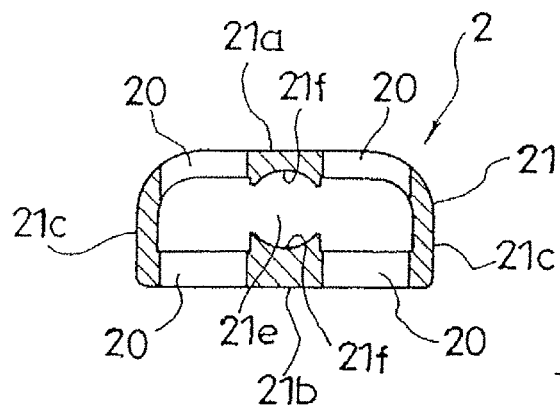
FIG. 26 is a cross-sectional view along the line J-J in FIG. 20.
Figure 27:
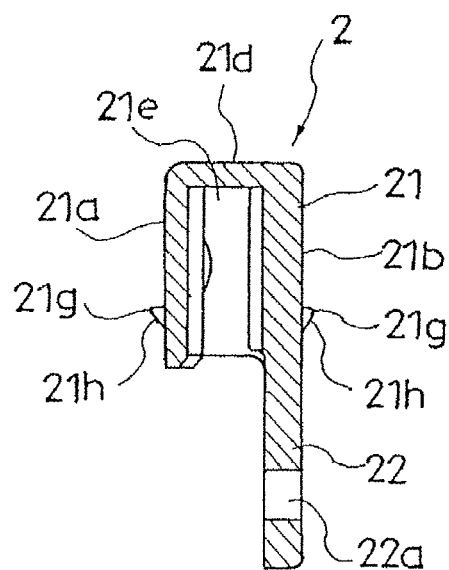
FIG. 27 is a cross-sectional view along the line H-H in FIG. 20.
Figure 28:
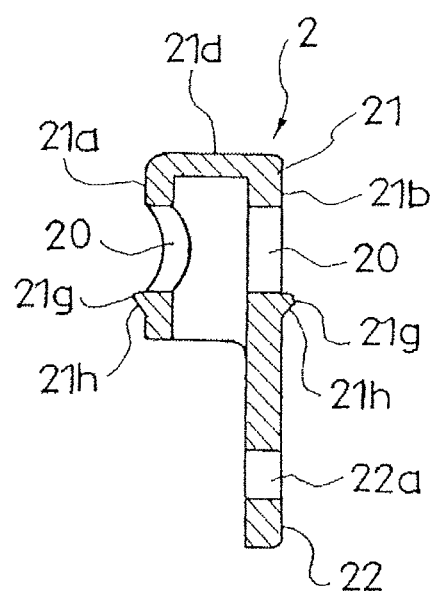
FIG. 28 is a cross-sectional view along the line I-I line in FIG. 20.

A general embodiment of the present invention will be described below with reference to FIGS. 1 to 28. A fastening tool 1 according to the present invention is used such that the fastening tool 1 is fastened to a desired position of a string body 5 while the string body 5 passes through the fastening tool 1. The fastening tool 1 is typically arranged at a drawing position of a drawstring or a tightening string that is drawn from a fitting object. The fastening tool is used such that a fastening position to the drawstring or the like is changed to change the length of the drawstring or the like looped around a narrowing-down portion of the fitting object so as to narrow down or loose the portion. The fastening tool 1 is also called a cord lock or the like in general. As the fitting object, any object that includes the string body 5 may be used. As fitting objects that is frequently used, clothes, bags, packs, and the like are given. The fastening tool 1 according to the embodiment can be fastened to the string body 5 that can be used as the drawstring or the like, and the material or the aspect of the string body 5 serving as an object to which the fasting tool is fastened are not limited.

The fastening tool 1 includes a male member 2 and female member 3. The male member 2 is combined to the female member 3 such that the male member 2 can be pushed to at least a predetermined position against the urging force. In addition, the fastening tool 1 is fastened such that the push-in state (or a push-in state by a drawing operation using an operating elongated member 6 described later) of the male member 2 to the string body 5 inserted through a side through-hole 20 of the male member 2 and a side through-hole 30 of the female member 3 that communicate with each other is released at the predetermined position.

The side through-holes 20 and 30 through which the string body 5 passes may be formed at two or more positions. In the illustrated example, the side through-holes 20 and 30 are formed at two positions in a direction orthogonal to the push-in direction of the male member 2. In this manner, in the illustrated example, both ends of one string body 5 drawn from a fitting object (not shown) are inserted concurrently through one fastening tool 1 to fasten the fastening tool to the string body 5.

In the illustrated drawing, the female member 3 is configured to have a flat cylindrical shape having a wide front-surface portion 31, a wide rear-surface portion 32, and narrow left- and right-side portions 33. Both ends of the cylinder of the female member 3 are opened.

The male member 2 includes a cylindrical head portion 21 and a leg portion 22. The cylindrical head portion 21 has a sectional outer shell shape in a direction orthogonal to the push-in direction of the male member 2, the sectional outer shell shape being matched with a sectional inner shell shape of the female member 3. More specifically, the cylindrical head portion 21 also has a flat cylindrical shape including a wide front-surface portion 21a, a wide rear-surface portion 21b, and both narrow left- and right-side portions 21c. The cylindrical head portion 21 has one cylinder end that is closed and the other cylinder end that is opened. The closed cylinder end of the cylindrical head portion 21 serves as an operating portion 21d used when the push-in operation is performed. The leg portion 22 is connected to the rear-surface portion 21b of the cylindrical head portion 21 and configured to have a plate-like shape extending from the other cylinder end of the cylindrical head portion 21 in the push-in direction.

The female member 3 includes a partition plate portion 34 between one cylinder end and the other cylinder end. The partition plate portion 34 projects from the internal surface to the rear-surface portion 32 side. The rear-surface portion 32 of the female member 3 is cut in a range from the other cylinder end to a portion near a projecting end of the partition plate portion 34 to form a rear-surface opening 35.

The male member 2 is put in the female member 3 from one cylinder end of the female member 3 to cause the leg portion 22 to face forward, and is combined to the female member 3. The front-surface portion 21a of the cylindrical head portion 21 of the male member 2 is guided to the internal surface of the front-surface portion 31 of the female member 3, the rear-surface portion 21b of the cylindrical head portion 21 of the male member 2 is guided to the internal surface of the rear-surface portion 32 of the female member 3, and the side portions 21c of the cylindrical head portion 21 of the male member 2 are guided to the internal surface of the side portions 33 of the female member 3. A size of the cylindrical head portion 21 between both the cylinder ends is almost equal to a size from one cylinder end of the female member 3 to the partition plate portion 34. The male member 2 is designed to be able to be maximally pushed to a position where the other cylinder end of the cylindrical head portion 21 contacts the partition plate portion 34 against urging force. The leg portion 22 extends from a position between the partition plate portion 34 and the rear-surface portion 32 of the female member 3 to the other cylinder end side of the female member 3 and comes close to the rear-surface opening 35.

In the male member 2, the side through-holes 20 are formed in the front-surface portion 21a and the rear-surface portion 21b of the cylindrical head portion 21 on both sides sandwiching a horizontal middle position of the cylindrical head portion 21, respectively. The side through-holes 20 are round holes, and the center of the side through-hole 20 formed in the front-surface portion 21a and the center of the side through-hole 20 formed in the rear-side portion 21b are positioned on the same virtual straight line orthogonal to the push-in direction of the male member 2.

On the other hand, in the female member 3, the side through-holes 30 are formed in the front-surface portion 31 and the rear-surface portion 32 on both sides sandwiching a horizontal middle position of the female member 3 between the partition plate portion 34 and one cylinder end, respectively. Each of the side through-holes 30 is configured by a round hole 30a and an auxiliary hole 30b formed by cutting the round hole 30a on the other cylinder end side. The center of the round hole 30a of the side through-hole 30 formed in the front-surface portion 31 and the center of the round hole 30a of the side through-hole 30 formed in the rear-surface portion 32 are positioned on the same virtual straight line orthogonal to the push-in direction of the male member 2.

In the illustrated example, a holding portion 21e of a compression coil spring 4 is formed between the left- and right-side through-holes 30 in the cylindrical head portion 21 of the male member 2. In the illustrated example, one spring end of the compression coil spring 4 held such that a central axis of the spring of the holding portion 21e goes along the push-in direction of the male member 2 in the holding portion 21e contacts the internal surface of the operating portion 21d of the cylindrical head portion 21 of the male member 2, and the other spring end of the compression coil spring 4 contacts the partition plate portion 34. The holding portion 21e, in the illustrated example, is configured by an arcuate concave portion 21f having the same outer shape as that of a winded portion of the compression coil spring 4 formed on the internal surfaces of the front-surface portion 21a and the rear-surface portion 21b of the cylindrical head portion 21. In the embodiment, the male member 2 can be pushed in the female member 3 to a position where the other cylinder end of the cylindrical head portion 21 contacts the partition plate portion 34 while compressing the compression coil spring 4.

In the illustrated example, retaining projecting portions 21g are formed on the front-surface portion 21a and the rear-surface portion 21b respectively between the side through-hole 20 on the cylindrical head portion 21 of the male member 2 and the other cylinder end of the cylindrical head portion 21. In the illustrated example, in a state in which the compression coil spring 4 is held by the holding portion 21e, when the male member 2 is pushed in the female member 3 to a position where the retaining projecting portions 21g are inserted into the side through-holes 30 of the female member 3, regardless of the urging force of the compression coil spring 4, the male member 2 does not project ahead of a position where the retaining projecting portions 21g hook on hole edges of the side through-holes 30 of the female member 3 on one cylinder end (cylinder end of the female member 3 located on the upper side in FIG. 5) side of the female member 3. An inclined surface 21h is formed on a side of the retaining projecting portion 21g facing the other cylinder end of the cylindrical head portion 21 of the male member 2. When the male member 2 is combined to the female member 3, the cylindrical head portion 21 of the male member 2 is slightly elastically narrowed down by the inclined surface 21h, and the female member 3 is slightly elastically expanded. For this reason, the combining operation can be smoothly performed. In the illustrated example, when the male member 2 is pushed in the female member 3 to a position the other cylinder end of the cylindrical head portion 21 contacts with the partition plate portion 34, the retaining projecting portions 21g are inserted into the auxiliary holes 30b of the side through-holes 30 of the female member 3.

The male member 2 includes an attaching portion for the operating elongated member 6. The male member 2 is moved to a predetermined position against the urging force by operating the operating elongated member 6. The operating elongated member 6 is typically attached to only the male member 2 to serve as a pull tab therefor. The operating elongated member 6 may have one end fixed to the fitting object of the fastening tool 1 to serve as a tying member that connects the fastening tool 1 to the fitting object.

In the illustrated example, a long slot 22a is formed in the leg portion 22 of the male member 2 in a direction almost orthogonal to the push-in direction of the male member 2, and the operating elongated member 6 having a belt-like shape is caused to pass through the long slot 22a by using the rear-surface opening 35 of the female member 3 to make it possible to attach the operating elongated member 6 to the male member 2. More specifically, in the illustrated example, the long slot 22a is designed to function as the attaching portion.

A positioning device 36 to the fitting object is formed on the female member 3. In the embodiment, the positioning device 36 serves as a passing portion 36b, formed on a side portion of the female member 3, for an elongated member 7 arranged on the fitting object. The passing portions 36b are formed at two positions of the side portion of the female member 3. In the illustrated example, the female member 3 includes tab portions 36a on both the left- and right-side portions of the female member 3. The rear surfaces of the tab portions 36a are located on the same plane as that of the rear-surface portion 32 of the female member 3, and a gap is formed between the front surfaces of the tab portions 36a and the front-surface portion 31 of the female member 3. In the illustrated example, the passing portions 36b each of which penetrates the tab portion 36a in a cross direction and has a slot-like shape long in the push-in direction of the male member 2 are formed in the tab portions 36a, respectively.

In the fastening tool 1 according to the embodiment, by the positioning device 36 of the female member 3, the female member 3 can be located at an arrangement position of the fastening tool 1 on the fitting object. In this manner, first, the male member 2 itself is pushed to the predetermined position or the string body 5 is drawn by force having strength that can push the male member 2 to the predetermined position to make it possible to perform an operation of releasing the fastening state of the fastening tool 1 to the string body 5 without pressing the female member 3. Secondly, an operation of drawing the male member 2 to the predetermined position by drawing the operating elongated member 6 can also be easily performed without pressing the female member 3.

Since the passing portions 36b are formed on the side portions of the female member 3, i.e., in the side portions 33, the female member 3 can be stably positioned to the fitting object such that the female member 3 is prevented by the elongated member 7, the belt-like body in the illustrated example, arranged on the fitting object in a direction orthogonal to the push-in direction of the male member 2 from moving and escaping with the push-in operation. In the illustrated example, since the passing portions 36b are formed at the two positions on the side portions of the female member 3, the elongated member 7 drawn through one of the two passing portions 36b is caused to pass through the other of the two passing portions 36b to make it possible to more stably position the female member 3 on the fitting object and to make it possible to move and adjust the female member 3 in the longitudinal direction of the elongated member 7.

In the illustrated example, the belt-like body serving as the elongated member 7 that is caused to pass through the left passing portion 36b of the female member 3 from the rear-surface portion 32 side of the female member 3, is caused to pass through the right passing portion 36b of the female member 3 from the front-surface portion 31 side of the female member 3, and drawn to the rear-surface portion 32 side again. The female member 3 is sandwiched between the belt-like body serving as the elongated member 7 and the fitting object to position the female member 3 at a predetermined position on the fitting object.

All the contents of the specification, the scope of claims, the drawings, and the abstract of Japanese Patent Application No. 2009-16586 filed on Jul. 14, 2009 are cited and taken as the disclosure of the specification of the present invention.

What is claimed is:

1. A fastening tool for a string body comprising:
   a female member having a positioning device formed on a side portion thereof adapted to be provided on a fitting object, and a first side through-hole, an urging device disposed in the female member, and a male member disposed in the female member to be pushed outwardly by the urging device and having a second side through-hole, the male member being pushed to at least a predetermined position of the female member against an urging force of the urging device so that a string body adapted to be inserted through the first and second side through-holes communicating with each other is released at the predetermined position, wherein the male member includes an attaching portion for an elongated operation member, the elongated operation member being adapted to be operated to move the male member to the predetermined position against the urging force, the side portion where the positioning device is formed is located laterally away from a pushing direction of the male member to the female member, the positioning device is formed at each side of the female member, and the male member has a front portion and a rear portion spaced apart from each other, each having said second side-through hole, said rear portion having a length in the pushing direction longer than that of the front portion and said attaching portion in the rear portion.

2. A fastening tool for a string body according to claim 1, wherein the female member includes a front portion, a rear portion spaced from the front portion, and a partition plate extending from an inner surface of the front portion to the rear portion, the urging device being placed on the partition plate.

3. A fastening tool for a string body according to claim 2, wherein the female member has two first side-through holes laterally spaced from each other, and the male member has two second side-through holes laterally spaced from each other, the urging device being held between the two second side-through holes.

* * * * *